(12) United States Patent
Griffin, III

(10) Patent No.: US 6,812,858 B2
(45) Date of Patent: Nov. 2, 2004

(54) INTEGRATED DISPLAY FOR AIRCRAFTS

(75) Inventor: John C. Griffin, III, University Place, WA (US)

(73) Assignee: The Boeing Company, Chicago, IL (US)

(*) Notice: Subject to any disclaimer, the term of this patent is extended or adjusted under 35 U.S.C. 154(b) by 418 days.

(21) Appl. No.: 09/933,027

(22) Filed: Aug. 20, 2001

(65) Prior Publication Data

US 2003/0034901 A1 Feb. 20, 2003

(51) Int. Cl.⁷ ............................................. G08B 21/00
(52) U.S. Cl. ....................... 340/945; 340/971; 340/973; 340/995; 701/3; 701/14
(58) Field of Search ................................ 340/945, 971, 340/973, 995; 701/3, 14

(56) References Cited

U.S. PATENT DOCUMENTS

| | | | |
|---|---|---|---|
| 3,944,998 A | 3/1976 | Perkins | 340/324 |
| 4,086,632 A | 4/1978 | Lions | 364/444 |
| 4,692,869 A | 9/1987 | King et al. | |
| 4,792,906 A | 12/1988 | King et al. | |
| 5,057,835 A | 10/1991 | Factor et al. | 340/995 |
| 5,398,186 A | 3/1995 | Nakhla | |
| 5,715,163 A | 2/1998 | Bang et al. | 364/444 |
| 5,758,297 A | 5/1998 | Gaultier | 701/14 |
| 5,797,106 A | 8/1998 | Murray et al. | |
| 5,842,142 A | 11/1998 | Murray et al. | |
| 6,112,141 A * | 8/2000 | Briffe et al. | 701/14 |
| 6,571,155 B2 * | 5/2003 | Carriker et al. | 701/3 |

OTHER PUBLICATIONS

Freedman, David H., *Flying Made Easy*, Technology Review, Mar. 2001, pp. 56–60.
Freeman, David H., *The Five–Minute Pilot*, Technology Review, Mar. 2001, pp. 62–67.

* cited by examiner

*Primary Examiner*—Julie Lieu
(74) *Attorney, Agent, or Firm*—Harness Dickey & Pierce P.L.C.

(57) ABSTRACT

An integrated display for displaying navigation and communication information from a plurality of sources on a single screen provides an overall picture of selected information. A graphical representation of the relationship between predetermined types of selected information is also provided. Visual representations of various components provide information and identify active components and data paths. A warning indication alerts to specific conditions and alternate modes of display operation are provided in response to specific component failures.

30 Claims, 8 Drawing Sheets

INTEGRATED DISPLAY FOR AIRCRAFTS

FIELD OF THE INVENTION

The present invention relates generally to displays for aircrafts, and more particularly to an integrated display for displaying information from a plurality of sources, as well as indicating the relationship between selected information.

BACKGROUND OF THE INVENTION

Navigation information provided to pilots in early commercial airplanes was typically in the form of bearing and distance information displayed on an electromechanical flight instrument. The source of the information usually was a navigation radio transmitter located on the ground. Onboard navigation radios would receive the signal and process the information for display on the electromechanical flight instrument. This navigation equipment was designed within standard industry tolerances so that navigation accuracy for each type of navigation radio was well known and airspace procedure designers could allocate blocks of airspace based on the expected accuracy of the navigation equipment.

For oceanic travel, or in remote areas not serviced by navigation radio transmitters, such that signals could not be received by onboard navigation radios, inertial reference systems (IRS) were developed to provide reasonably accurate navigation information to pilots. Airspace procedure designers for routes in these areas also relied upon expected industry standards for navigation accuracy of these systems.

Global Navigation Satellite Systems (GNSS), including the Global Positioning System (GPS), were introduced in the 1990's. These systems provided increased navigation accuracy for commercial airplanes compared to both navigation radios and IRS. Modern Flight Management Computer Systems (FMCS) were developed with the capability to generate an integrated navigation solution using inputs from the navigation radios, IRSs and GNSSs.

A further development was the introduction of additional navigation standards, including the creation of the concepts of Required Navigation Performance (RNP) and Actual Navigation Performance. With these concepts, airspace procedure designers could create procedures with the flexibility of different levels of airplane navigation accuracy or Actual Navigation Performance, and assign each procedure an RNP with which the airplane must comply in order to legally fly the procedure. FMCSs were developed with the capability of predicting a circular error of probability within which the airplane was expected to be almost all of the time (e.g., 95%), which probability estimate is the Actual Navigation Performance of the airplane.

The capabilities of the FMCSs were further expanded to allow manual entry of an RNP (e.g., by a pilot). The FMCS continuously monitors the relationship of Actual Navigation Performance to the RNP and provides a warning indication (e.g., an alert message) to the pilot if an exceedance occurs, for example, if the Actual Navigation Performance exceeds the predetermined RNP limit.

The concepts of Actual Navigation Performance and RNP have increased design flexibility, but are difficult to visualize by a pilot. Aircraft displays configured for providing Actual Navigation Performance and RNP information fail to provide an overall picture of the navigation system. For example, current FMCSs only provide a digital display of Actual Navigation Performance and RNP. Additionally the status, number and type of systems that contribute information to the FMCS, which ultimately result in the navigation solution, and the associated Actual Navigation Performance, are not easily discernable in current commercial airplanes. Further, the status and number of operating components that affect the navigation performance are displayed in a variety of locations forcing the pilot to visualize (e.g., deduce from several locations) the overall status of the navigation system in order to determine this information. Also, some navigation components can be turned off to prevent them from contributing to the navigation solution of the FMCS (e.g., GPS and/or VOR), which adds a further layer of complexity for a pilot trying to determine specific navigation information.

For example, on the Boeing® 747®, 757®, 767®, and 777® airplanes, information about navigation performance and system status is displayed on several pages of a Control Display Unit (CDU), including POS REF pages and REF NAV DATA pages. On the Boeing® 737® airplane, the status of some of the navigation system components is captured on two display formats called the NAV STATUS and NAV OPTIONS page on the FMCS CDU. On these displays, the pilot can determine information regarding specific navigation components. However, the information is only displayed in digital format and a pilot must still create a mental model of the entire navigation system picture. Further, a pilot may still have to determine additional information from other display screens. Also, the relationship between different information, for example, Actual Navigation Performance and RNP is displayed in digital format. Thus, a pilot must again determine the total navigation system "picture" of the relationship between the information provided by specific components because there is no single graphical display for providing this information.

In addition to developments in aircraft navigation systems, communication systems were also developed to facilitate and improve aircraft flight. Early communication systems were supported exclusively by Very High Frequency (VHF) radios configured for data transmission. Improvements and advances in communication technology allowed for satellite communications (SATCOM) systems and High Frequency (HF) radios to support data communications in flight. The amount and type of information that is now exchanged between a commercial airplane and facilities on the ground has grown to a point that the pilot may have to search several locations in order to determine where and how data is being communicated to and from the airplane. This may include determining the type of communications systems (e.g., SATCOM, VHF or HF) that are enabled, the frequencies on which these systems are operating and the status of alternate communications paths in the event of a lost connection or component failure.

As a result of the increased flow of information to and from commercial aircrafts, the use of more complex systems in commercial airplanes, such as Data Link, is becoming increasingly widespread. Airline companies now routinely transmit flight planning, weather, airplane performance and administrative information electronically to airplanes around the world. This information, in combination with navigation information from the GNSSs, provide more reliable data for use in maintaining a flight course within a predetermined flight plan and/or to more easily change the flight course based upon external conditions (e.g., unexpected weather changes). Further, a variety of onboard communications systems have been developed to provide connectivity with airline ground facilities through Data Link service providers. Thus, the use of electronic information for air traffic control (i.e., communication and navigation control) of airplanes is growing.

For example, on airplanes prior to the Boeing® 777®, data communications tasks were distributed among a number of onboard systems. On the Boeing® 777®, the data communications functions were consolidated and a "manager" function was provided that allows the pilot to evaluate the system status and reconfigure the system if desired. However, the total data communications system "picture" must still be determined (i.e., visualized) by the pilot because there is no single overall display (e.g., graphical display) that shows the status of the radio equipment (e.g., SATCOM, VHF, and HF), including the active components receiving information. Further, no depiction or representation of which types of data communications are currently linked with an external system is provided.

Thus, although the amount of navigation and communication information available for use during flight has increased, thereby facilitating aircraft control, accessing this information is often difficult and/or tedious. Further, the information is displayed such that an overall "picture" of the system (e.g., combined status of various components) is not available.

SUMMARY OF THE INVENTION

The present invention provides a complete integrated picture of the various systems onboard an aircraft to thereby provide intuitive and comprehensive navigation situational awareness and data communications situational awareness for the pilot of a modern commercial airplane. In particular, information regarding the onboard navigation system, including which components are functioning, which components are receiving external data, which components are connected to the FMCS and contributing to the navigation solution and the relationship between actual and required navigation system performance is provided on a single display. Further, information regarding the onboard data communications system, including which components are functioning and which components are receiving external data or transmitting data is also provided on a single display. The invention also provides a picture of the navigation system operation and connectivity, and/or the data communications system operation and connectivity in the event of individual component failures, and portrays the remaining redundancy.

Generally, an integrated display is provided that displays an overall "picture" of system operation, including information relating to specific onboard components. In particular, the present invention includes an integrated navigation synoptic display and method of providing the same that displays the current state of all onboard navigation components and provides a graphical representation of the relationship between Actual Navigation Performance and RNP on a linear scale. The scale is automatically adjusted based on the values of the Actual Navigation Performance and RNP. Reversionary modes of the navigation system are provided in the event one or more components become inoperative or data from an external system (e.g., navigation radio transmitter or GPS) becomes unavailable.

An integrated display of the present invention also provides for displaying an "overall" picture of the current state of all onboard data communications components and provides a visual representation of which links are established, as well as what types of data are being transmitted, thus providing an integrated data communications synoptic display. Reversionary modes of the data communications system are provided in the event one or more components become inoperative.

An integrated display constructed according to the principles of the present invention provides an overall view of specific information (e.g., real-time fight information) relating to the navigation and/or communication systems onboard an aircraft. The display is adapted for providing information from a plurality of navigation and communication components onboard the aircraft on a single display screen. The display screen provides information from selected sources and includes a graphical portion having a graphical representation of the relationship between predetermined types of selected information. This may include a graphical representation of the relationship between Actual Navigation Performance and RNP. Further, visual representations identifying the sources of the information being displayed and indicating the status of the components communicating the information may also be provided.

With respect to providing navigation information from an onboard navigation system, visual representations provide status information regarding specific onboard components, with the relationship between actual data and a required acceptable deviation or limit (e.g., Actual Navigation Performance versus RNP) preferably displayed as concentric circles on an automatically adjusting linear scale. The concentric circles provide a relative indication of the difference in value between the information represented by the circles. When displaying Actual Navigation Performance versus RNP, a warning indication is preferably provided when the Actual Navigation Performance value exceeds a limit based upon the RNP value.

With respect to providing communication information from an onboard communication system, visual representations provide status and connectivity information. Preferably, active sources of information and data paths or links are highlighted on the display. Therefore, inactive sources and/or links are easily identified.

A display selector may be provided in combination with the present invention to select a specific display screen on an aircraft instrument panel on which to display information provided by the present invention (e.g., select one of a plurality of multifunction displays). Further, a display of the present invention provides alternate modes of operation in the event of a failure of one of the navigation and/or communication components onboard the aircraft.

Thus, the integrated display and method of providing the same displays of selected information from sources onboard an aircraft (e.g., onboard navigation and communication components). The invention provides an overall view of selected information and includes a graphical representation of the relationship between specific selected information (e.g., Actual Navigation Performance and RNP).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the application of the present invention as disclosed herein is generally directed to specific aircrafts and displays therein, it is not so limited, and the display of the present invention may be provided in connection with any type of aircraft receiving information from multiple sources and/or different types of information from a single source. Further, the aircrafts may be provided with different types of instrument panels having different display screens.

Figure 1:
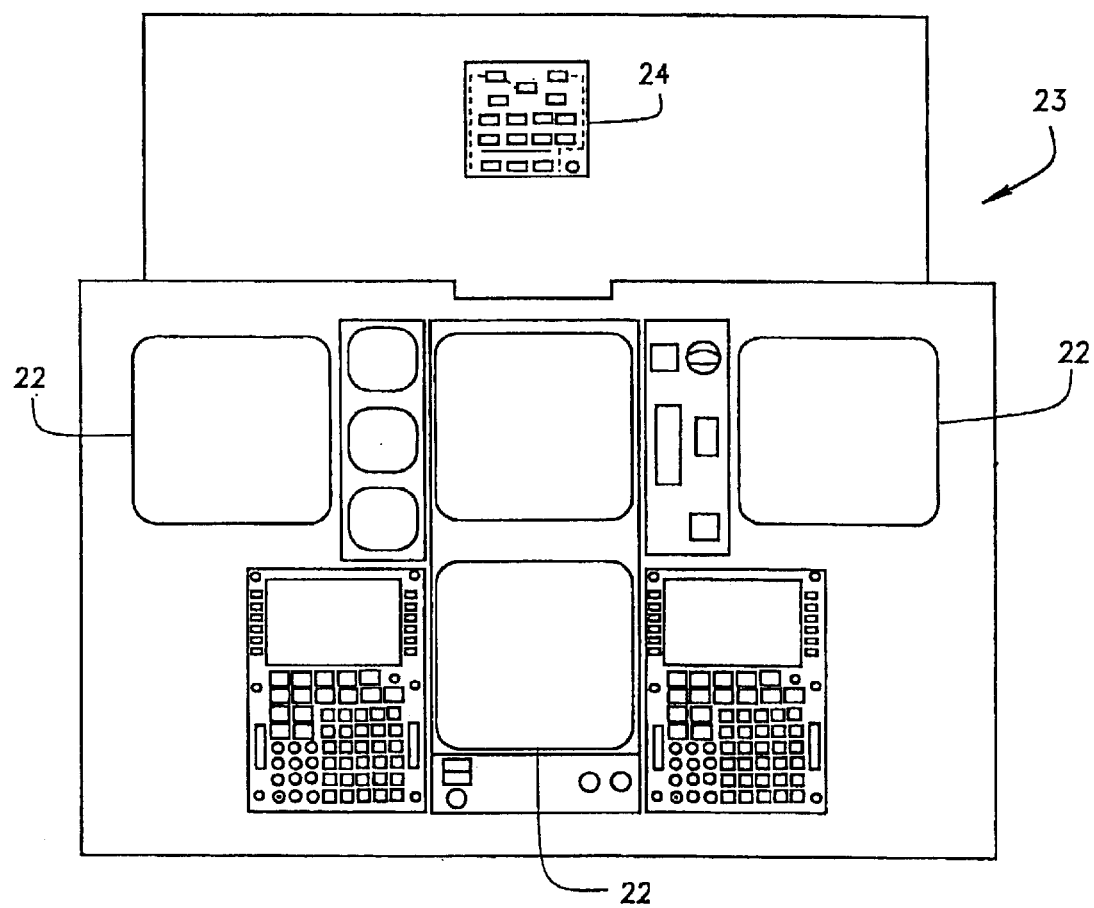
FIG. 1 is a partial front plan view of an aircraft instrument panel having multiple display screens.

A navigation synoptic integrated display according to a preferred embodiment of the present invention is shown generally in FIGS. 2 through 7 and indicated by reference numeral 20. The display 20 forms an integrated navigation and data communications synoptic display and may be provided in connection with different instrument panels on different aircrafts. For example, as shown in FIG. 1, the display 20 may be selectively provided on any one of the three 9"×9" multifunction display screens 22 in a Boeing® 777® aircraft. The display 20 may also be provided on any of the display screens in Boeing® 767®-400 aircraft or on the single multifunction display screen in a Boeing® 747®-400 aircraft. In an aircraft having multiple display screens 22 (e.g., Boeing® 777®), a display selector panel 24 is provided as part of an instrument panel 23 for designating or selecting which of the display screens 22 will provide the display 20. It should be noted that the display 20 may also be modified for use in connection with other aircraft models.

Figure 2:
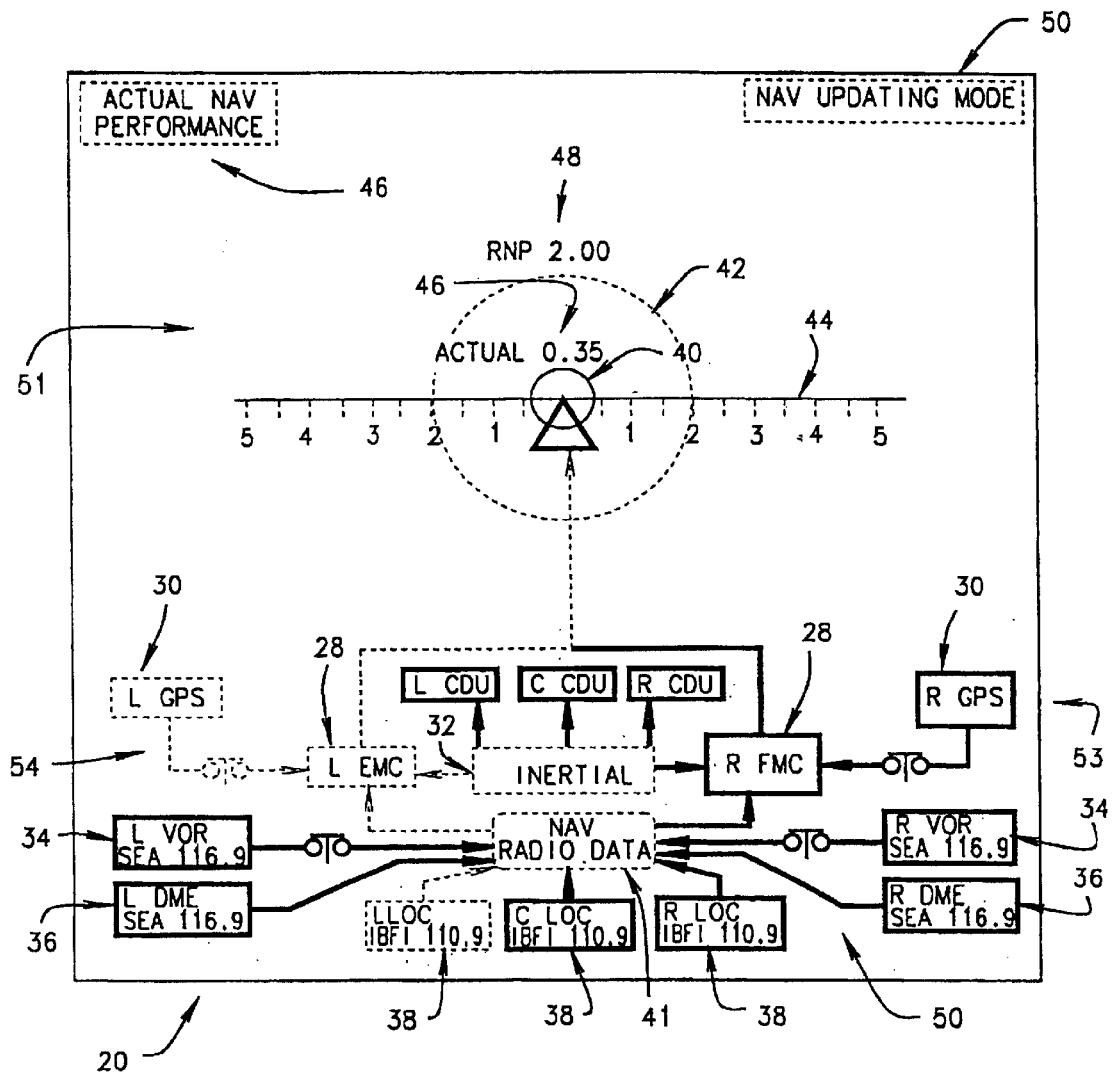
FIG. 2 is a screen layout of a display constructed according to the principles of the present invention displaying navigation information.
Figure 3:
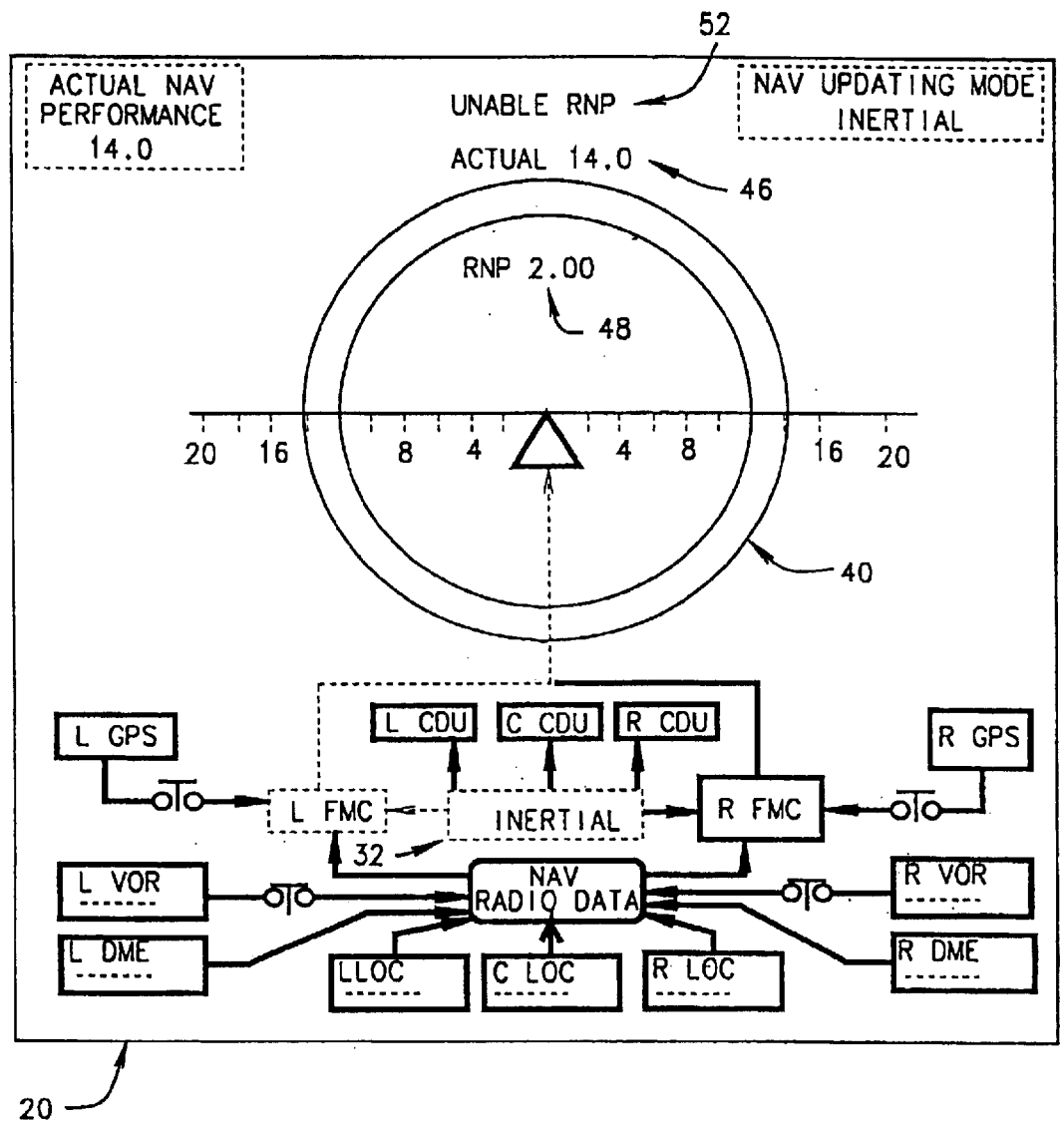
FIG. 3 is a screen layout of a display of the present invention displaying navigation information wherein a required parameter is exceeded.
Figure 4:
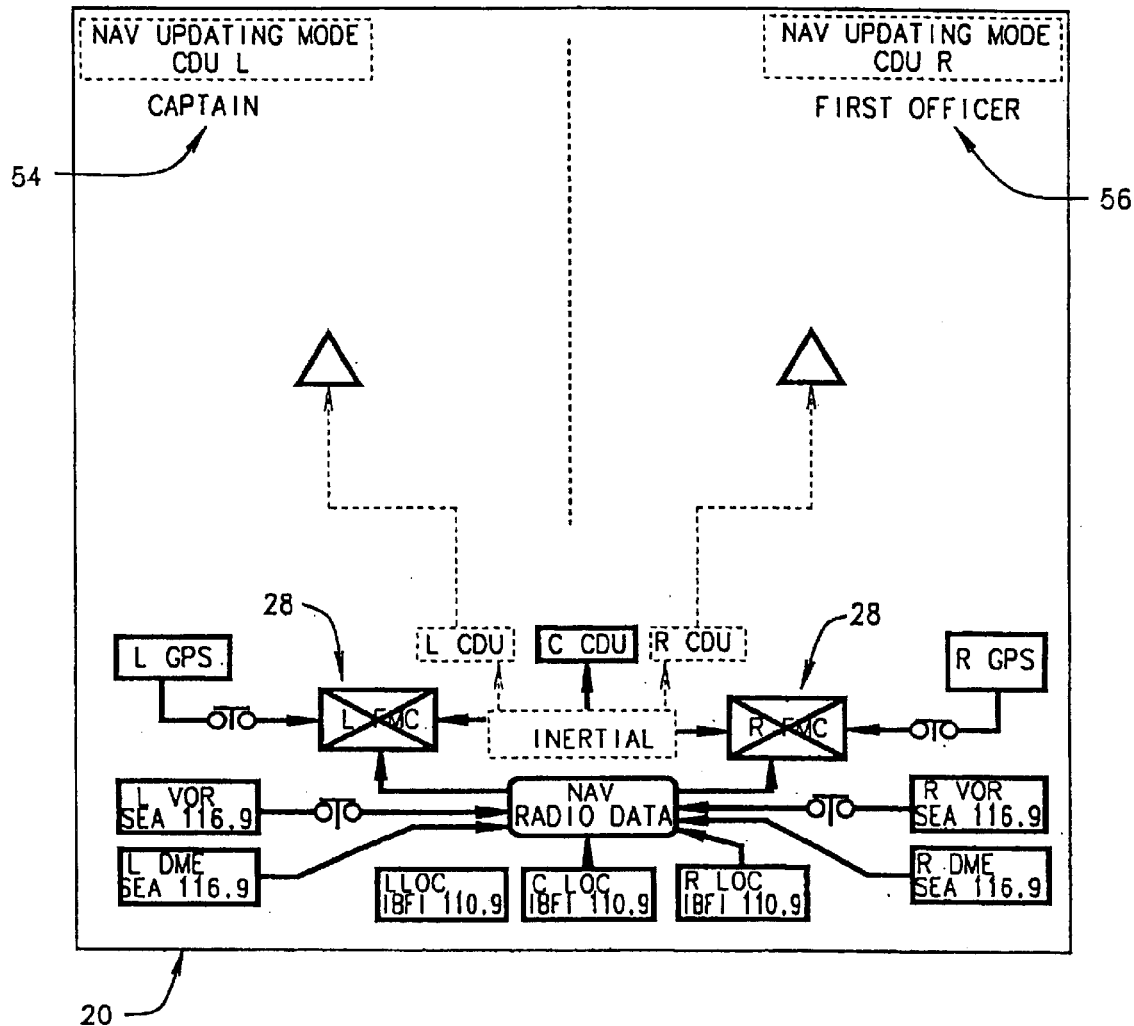
FIG. 4 is a screen layout of a display of the present invention displaying navigation information wherein specific components have failed.

FIGS. 2 through 4 show the navigation synoptic display 20 on a 9"×9" display screen 22 providing information from the navigation system of a Boeing® 777® aircraft. Generally, the navigation components onboard the Boeing® 777® aircraft consist of an Air Data and Inertial Reference Unit (ADIRU), two Voice Omni Range (VOR) receivers, two Distance Measuring Equipment (DME) transmitter/receivers, three Landing System Localizer (LOC) receivers, two GPS receivers, two FMCs, and three CDUs with backup navigation capability.

Referring to FIG. 2, navigation system components are preferably represented on the display 20 as icons. With respect to a Boeing® 777® aircraft, the components that generally make up the navigation system and that are displayed on the display 20 as such icons include: left and right FMC icons 28, left and right GPSs icons 30, and the ADIRU icon 32. Further, current tuning information, including radio frequency and a station identifier are displayed by the VOR icons 34, DME icons 36 and three LOC navigation radio icons 38. Inputs from the radios are shown merged in a radio position icon 41 (i.e., NAV RADIO DATA). A highlighted box (e.g., a green box) surrounding specific icons indicates those components actively participating in the navigation solution. Active data paths 54 are also highlighted (e.g., as green lines). As shown, icons are in dashed lines to represent highlighting and active data paths 54 are dashed lines to represent highlighting.

Referring further to FIG. 2, aircraft location information, including Actual Navigation Performance and RNP information is displayed at 40 and 42, respectively, as a graphical representation (i.e., concentric circles) on a graphical component 51 of the display 20 having a linear scale 44 with measurement units (e.g., in nautical miles (NM)). Additionally, digital values of Actual Navigation Performance and RNP are displayed at areas 46 and 48, respectively. Further, the overall navigation mode, which shows the components contributing to the navigation solution, is displayed at 50. Thus, various navigation components providing information are displayed as visual representations, such as icons, on a control portion 53 of the display 20, while the graphical data and/or information is displayed on a graphical component 51 of the display 20.

In operation, and as shown in FIG. 2, the synoptic display 20 displays information provided from selected sources. Specifically, and as shown therein, active sources providing information presented on the display 20 include the left FMC icon 28, which is providing all the navigation computations, with navigation system inputs from the left GPS icon 30 and the left LOC 38. It should be noted that the icons for these active components and the active communication data paths are highlighted as described herein. This highlighting indicates the specific selected navigation components participating in the navigation solution displayed on the display 20. As shown in FIG. 2, RNP is 2.00 nautical miles as indicated at area 48 and the Actual Navigation Performance is 0.34 NM as indicated at area 46. Therefore, the aircraft is within the RNP limit.

FIG. 3 shows a display 20 in operation wherein the pilot has turned off GPS updating of the FMCS. In this example, the aircraft having the display 20 is out of range of all navigation radios and the IRS icon 32 has been in operation (i.e., active) for a lengthy period of time such that its predicted uncertainty is 14 NM as indicated at 46, which exceeds the RNP of 12 NM as indicated at 48. A warning indication as to this condition is preferably provided. For example, the graphical representation 40 associated with the Actual Navigation Performance data may become amber to indicate the exceeded condition, and a message corresponding to the current 777® aircraft alerting condition for this situation, such as, "UNABLE RNP", is displayed on the display 20 at 52.

Referring now to FIG. 4, and another example of the display 20 in operation is provided in which both FMCs have failed. This is indicated by an "X" in the FMC icons 28, with the left CDU taking over the navigation task for the Captain's display, (i.e., L CDU icon illuminated) indicated at 54, and the right CDU taking over the navigation task for the First Officer's display (i.e., R CDU icon illuminated), indicated at 56. In this instance, Actual Navigation Performance and RNP information is not available on the display 20.

Further, in this example of the Boeing® 777® aircraft current design, updating of the CDU's is accomplished exclusively by the ADIRU (i.e., inertial system). In aircrafts where updating of the CDU navigation is accomplished by other sources, such as GPS, this also may be indicated.

Figure 5:
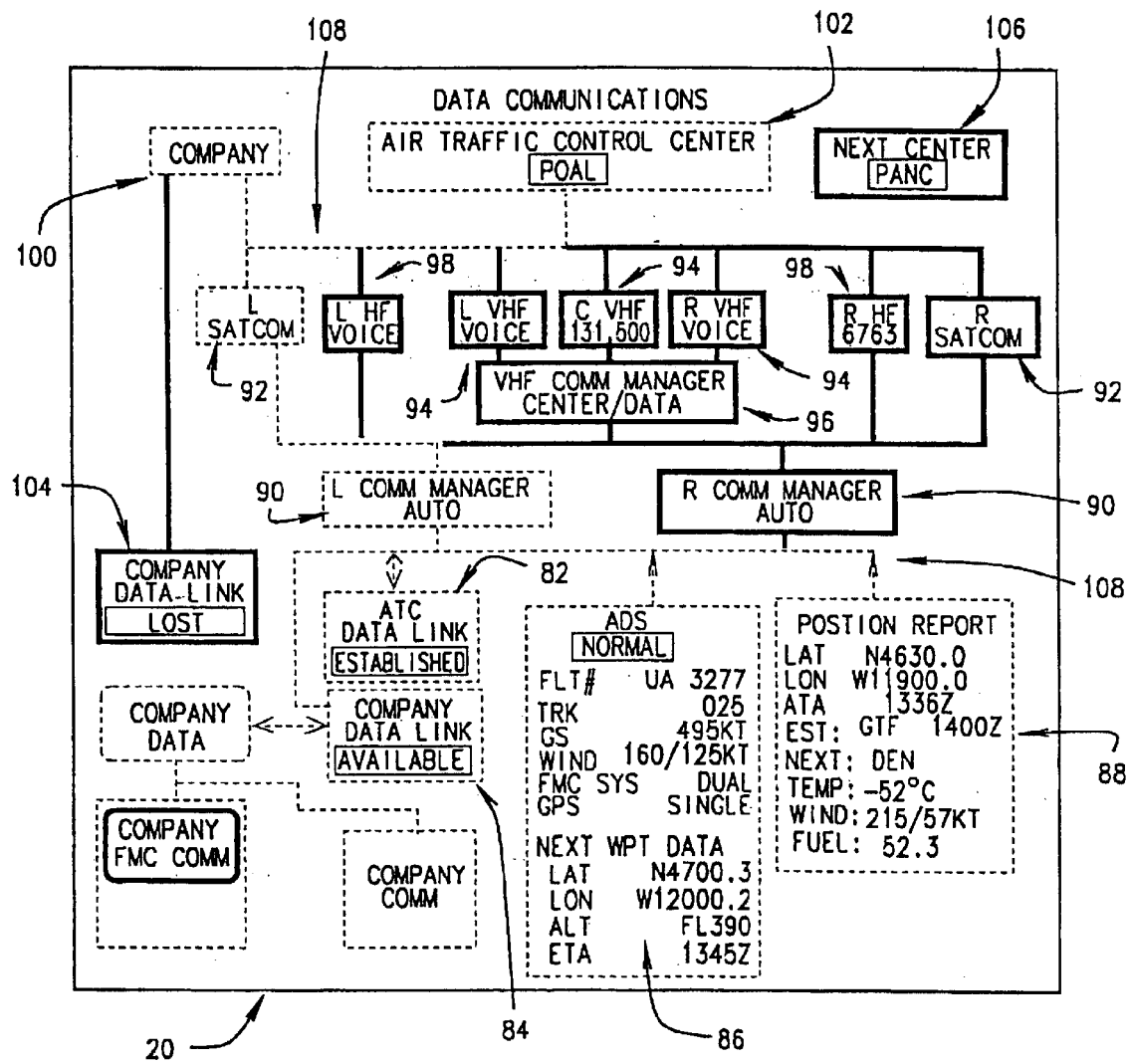
FIG. 5 is a screen layout of a display of the present invention displaying communication information during aircraft flight.
Figure 6:
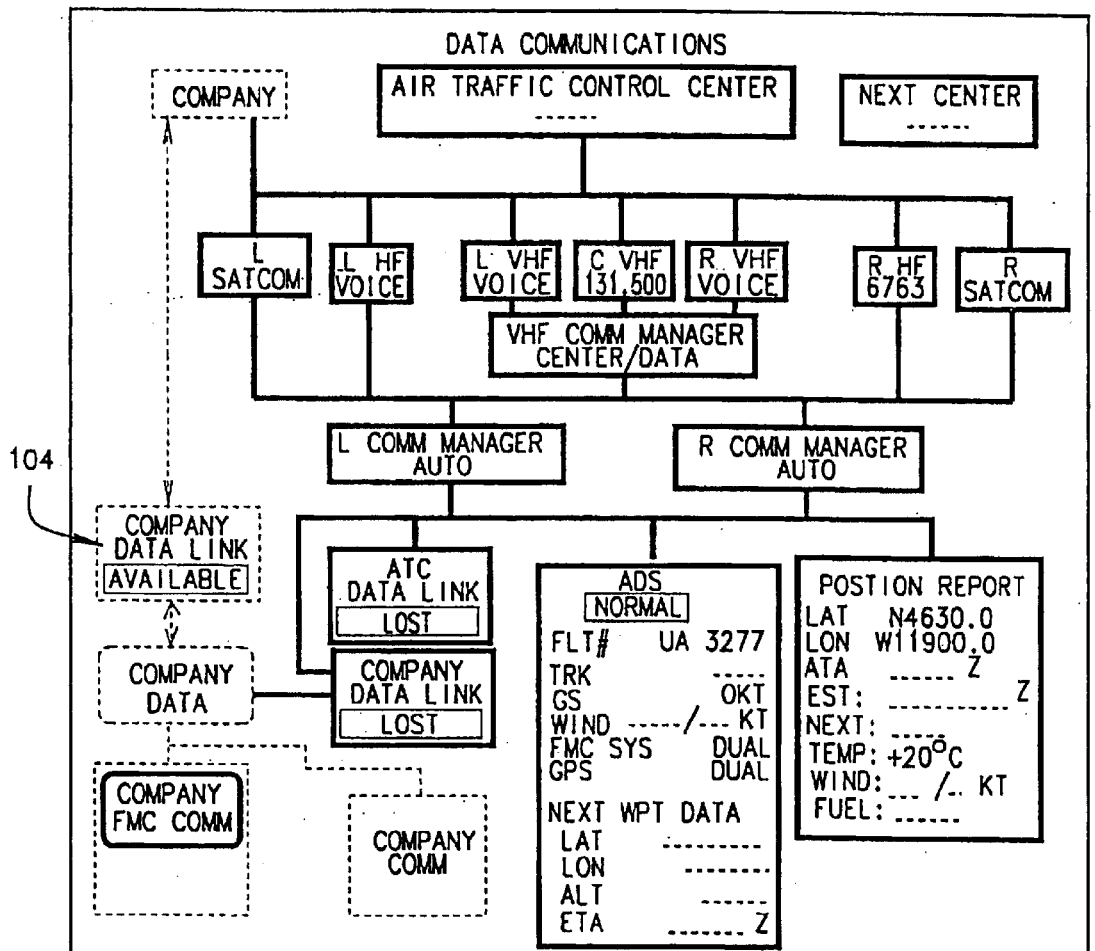
FIG. 6 is a screen layout of a display of the present invention displaying communication information when not in flight.
Figure 7:
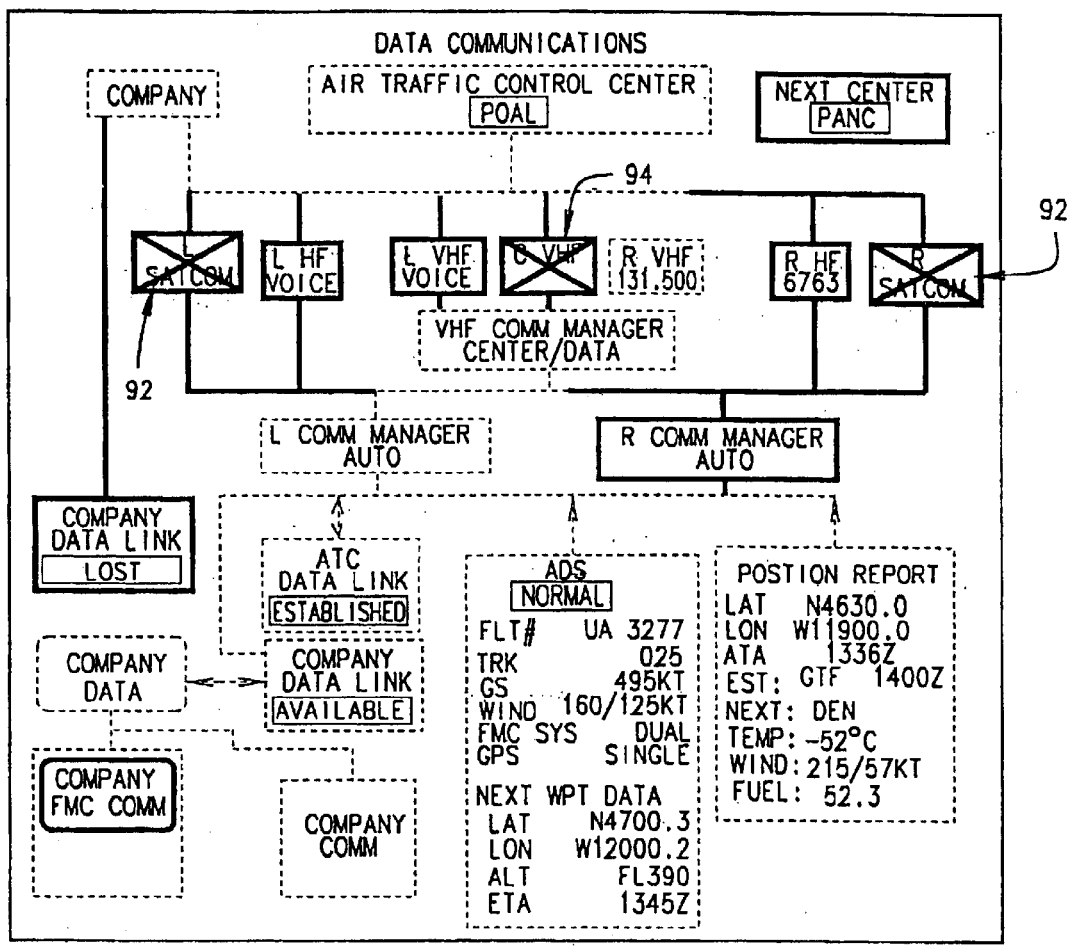
FIG. 7 is a screen layout of a display of the present invention displaying communication information wherein specific components have failed.

With respect to displaying communication information from a plurality of onboard components on the display 20, FIGS. 5 through 7 show the display 20 implemented on a 9"×9" display screen 22 in connection with the communication system of a Boeing® 777® aircraft. Specifically, and as shown in FIG. 5, data communication system components are represented on the display 20 as icons. It should be noted that while displaying communication system information, the control portion 53 encompasses the entire area of the display 20, with no graphical component 51 displayed. However, the display 20 may be modified and a graphical component 51 may also be provided as required or needed. For example, a graphical depiction of actual Communications System Performance (CSP) compared to a required CSP may be displayed in a similar manner to Actual Navigation Performance and RNP data.

As shown in FIGS. 5 through 7, in a Boeing® 777® aircraft, the components which generally make up the in-flight data communications system which have icons on the display 20 include: Air Traffic Control Data Link icon 82, airplane company data link icon 84, Automatic Dependent Surveillance icon 86, and automatic or manual airplane position reporting icon 88. Further, data may be routed via one of two onboard data communications managers, indicated as icons 90, through SATCOM links indicated as icons 92, or via one of three VHF radios, indicated as icons 94, using a VHF communications manager indicated as icon 96. Additional icons may be provided on the display 20 if in the same is employed on a specific aircraft, such as on a Boeing® 777® aircraft. Such additional icons may include HF radio icons 98, which radios may be configured for data communications and various other icons. Also, and for example, an indication as to multiple contracts between the aircraft and various air traffic control agencies may be shown in connection with the Automatic Dependent Surveillance icon 86.

With respect to groundside communications, specific icons may be provided to show connections with an airline company, as indicated by icon 100, or a currently active Air Traffic Control facility, indicated as icon 102. Some airports provide a Gate Link connection at the gate for data communications with the airline company via a landline, or other suitable communication medium, which connection is indicated via icon 104. A look ahead capability is provided to the next Air Traffic Control facility and indicated via icon 106. Components actively participating in data communications are highlighted, for example, by a green box, indicated by the dashed lines. Further, active data paths are highlighted, such as, for example, by displaying them as green lines, as indicated by dashed lines.

Referring again to FIG. 5, and illustrating the operation of the display 20, shown therein is a typical airborne condition wherein the airplane is under ATC data link control. This condition is indicated when the ATC icon 82 and Air Traffic icon 102 are highlighted, with automatic dependent surveillance active as indicated by the highlighted active ADS icon 86, and when an active link with the airline company is available, as indicated by the highlighted active Company Link icon 84 and Company icon 100. The active data communication components are preferably highlighted by a colored box (e.g., a green box) surrounding the appropriate associated component icons. The highlighting is again represented by shading over these icons. Active data paths 108 are preferably indicated by highlighted data path lines (e.g., green data path lines), shown as dashed lines. Further, an indication may be provided to show that a specific communication source is established, available or lost. For example, the ATC icon 82 includes an "ESTABLISHED" indication, the Gate Link icon 104 includes a "LOST" indication, to account for those conditions during flight when these connections are established and lost. The Company Link icon 84 includes an "AVAILABLE" indication to indicate when a link to a specific airline communications center is available. Other or alternate indications may be provided as needed. Further, information regarding pending data, for example, pending uplinks, may be provided in connection with the airline company data link icon 84. This may include specifically identifying the pending links and the number pending, which may be prioritized and routed to a queue.

In operation, when an airplane having the display 20 is on the ground and "plugged into" the Gate Link system, the Company Gate Link icon 104 is highlighted. An indication may be provided as to the active state (e.g., "AVAILABLE") as shown in FIG. 6. Again, active components and data paths are highlighted. Another example of the operation of the display 20, as shown in FIG. 7, is the condition wherein the SATCOM system and the center VHF radio are inoperative, and a data path through the right VHF radio has been established. Preferably, a warning indication, such as an "X" through the icons associated with the inoperative components of the display 20 is provided to alert an individual (e.g., pilot) viewing the display 20 as to this condition. Thus, a warning indication in the left and right SATCOM icons 92 (i.e., L SATCOM and R SATCOM icons) and the CVHF icon 94, shown as an "X", provides an alert as to this condition.

Figure 8A:
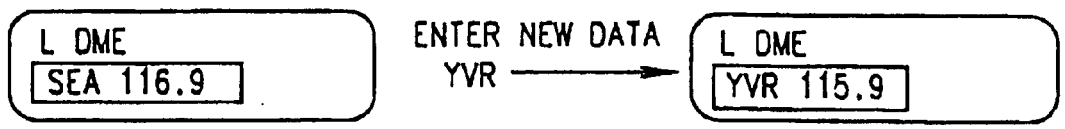
FIGS. 8(a) and 8(b) are icons of a display of the present invention capable of modification.
Figure 8B:
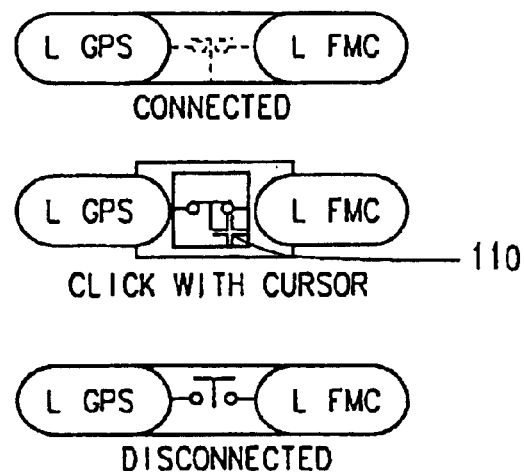

The display 20 of the present invention may also provide interactive operation. For example, control may be provided via a cursor on the display 20 using an external control device, such as, a mouse, trackball, touchpad, or similar device that may be incorporated as part of the instrument panel 23. Thus, as shown in FIG. 8(a), and for example, alphanumeric entry of information (e.g., new data for the L DME icon 36) may be provided via a keyboard. As another example, a cursor control may be provided to disconnect certain links (i.e., active data paths) as shown in FIG. 8(b). As shown therein, "clicking" with a cursor 110 on the active link using an external control device (e.g., mouse) disconnects the link and provides an appropriate indication.

Therefore, the display 20 of the present invention provides an overall "picture" of navigation and communication systems, including information relating to specific components onboard a commercial aircraft. A graphical representation of predetermined information further enhances the overall "picture" of system performance and operation.

Although the present invention has been described in connection with specific aircrafts having specific navigation and communication systems and connections, it should be appreciated that different and/or additional components may be provided to the display, and the display may be modified to display further information. This may include, for example, different icons representing different onboard components. Further, different visual representations may be used instead of icons, including, for example, text in a rectangular box, or a "picture" or "pictogram" representing specific information. Additionally, highlighting of icons and data paths may be provided in any manner sufficient to indicate active components and data paths, and/or a warning as to a possible abnormal condition (e.g., failure of a component). Also, the screen layouts described herein are merely exemplary and a display of the present invention is capable of displaying other conditions and information indifferently.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for use with an aircraft to provide navigation and communication information from a plurality of sources on a single display, the system comprising:
    a plurality of navigation components onboard the aircraft for providing navigation information from a plurality of sources;
    a plurality of communication components onboard the aircraft for providing communication information from a plurality of sources;
    an integrated display for displaying selected navigation and communication information, and adapted to provide a graphical representation of the relationship between at least some of the navigation and communication information for controlling the aircraft; and
    wherein the integrated display comprises a graphical portion adapted for displaying a graphical representation, the graphical representation comprising concentric circles with a first concentric circle representing the actual navigation performance data, and a second concentric circle representing the required navigation performance input.

2. The system according to claim 1 wherein the at least some of the navigation and communication information comprises aircraft location information, and the integrated display is adapted for graphically displaying a relationship between selected aircraft location information.

3. The system according to claim 1 wherein the navigation information comprises actual navigation performance data and further comprising a flight management system adapted for receiving a required navigation performance input.

4. The system according to claim 1 wherein the graphical portion further comprises a linear scale with the concentric circles superimposed thereon.

5. The system according to claim 4 wherein the linear scale comprises segments each representing a unit value, and wherein the graphical portion is adapted for automatically adjusting the unit values based upon the values of the actual navigation performance data and the required navigation performance input.

6. The system according to claim 1 wherein the concentric circles are adapted to display a measured difference between the actual navigation performance data and the required navigation performance input.

7. The system according to claim 1 wherein the required navigation performance input defines a limit and the graphical representation is configured for providing a warning indication when the actual performance data exceeds the limit.

8. The system according to claim 1 wherein the integrated display comprises a control portion adapted for displaying control information relating to the navigation and communication components.

9. The system according to claim 8 wherein the control portion comprises visual representations of the navigation and communication components with each visual representation configured for indicating status information.

10. The system according to claim 9 wherein the visual representations are configured to indicate active components providing information to the integrated display.

11. The system according to claim 10 wherein the visual representations further comprise data path elements configured for indicating communication paths between the navigation and communication components.

12. The system according to claim 1 wherein information from specific navigation and communication components is adapted to be deactivated and the integrated display is configured to display information only from active navigation and communication components.

13. The system according to claim 1 wherein the integrated display is configured for alternate modes of operation in the event of a failure of at least one of the navigation and communication components providing information to the integrated display.

14. The system according to claim 1 further comprising a plurality of display members and a display selector for selecting one of the plurality of display members as the integrated display for displaying the navigation and communication information.

15. The system according to claim 14 wherein the plurality of display members are multifunction displays and the integrated display is adapted for displaying specific information relating to the navigation and communication components on at least one of the multifunction displays.

16. The system according to claim 1 further comprising an external control device operable to change the selected information from the navigation and communication components.

17. The system according to claim 16 wherein the integrated display comprises a moveable visual member adapted for control by the external control device to change the selected information relating to the navigation and communication components.

18. The system according to claim 12 further comprising an external control device adapted to control a visual indicator of the integrated display to deactivate the specific navigation and communication components.

19. An aircraft instrument panel having at least one display and an interface for providing real-time information from a plurality of sources to display on the at least one display, the interface comprising:
    a visual component capable of displaying real-time information from the plurality of sources on the at least one display and adapted for identifying specific selected sources of the real-time information;
    at least one graphical component adapted for displaying the relationship between two or more of the information from the specific selected sources; and
    wherein the visual component comprises visual representations of the sources of information capable of display on the at least one display, the visual representations adapted for identifying active sources of real-time information being displayed and active data oaths between the plurality of sources of real-time information.

20. The interface according to claim 19 wherein the real-time information comprises actual performance data and a specified required performance input, and wherein the at least one graphical component is configured for displaying graphically the difference between the actual performance data and the specified required performance input.

21. The interface according to claim 19 wherein the aircraft instrument panel comprises a plurality of displays and further comprising a selector for selecting one of the plurality of displays on which to display the real-time information.

22. The interface according to claim 19 wherein the aircraft instrument panel further comprises an external control device adapted for changing the specific selected sources of the real-time information being displayed.

23. A method of displaying navigation and communication information from a plurality of sources on a single display for use with an aircraft, the method comprising the steps of:

displaying visual components via icons representing the plurality of sources capable of providing navigation and communication information to the single display;

indicating the active sources providing navigation and communication information to the single display by highlighting the icons associated with the active sources; and representing graphically the relationship between at least some of the navigation and communication information from the active sources by providing a highlighted graphic line between the active sources.

24. The method according to claim 23 wherein the step of representing graphically further comprises displaying a plurality of concentric circles on a linear scale representing the relationship between at least some of the information.

25. The method according to claim 24 wherein the at least some of the information is actual navigation performance information and a required navigation performance limit, and wherein the step of representing graphically further comprises configuring one of the concentric circles to represent the actual navigation performance information and another of the concentric circles to represent the required navigation performance limit.

26. The method according to claim 24 wherein the step of displaying visual components further comprises indicating active data paths between the sources.

27. An integrated display for use with an aircraft to display information from a plurality of sources to provide aircraft control, the integrated display comprising:

a plurality of visual representations adapted for indicating which of the plurality of sources is active and providing information for aircraft control; and a plurality of graphical communication path representations adapted for indicating active communication paths between the plurality of active sources.

28. The integrated display according to claim 27 wherein the information is navigation and communication information and the plurality of visual representations comprise visual elements representing onboard navigation and communication components.

29. The integrated display according to claim 27 further comprising a graphical component for displaying the relationship between information from at least some of the plurality of sources.

30. The integrated display according to claim 29 wherein the information from at least some of the plurality of sources is actual navigation performance data and a required navigation input, and further comprising graphical representations adapted for indicating the relationship between the actual navigation performance data and the required navigation input.

* * * * *